(12) United States Patent
Hu

(10) Patent No.: US 9,542,004 B1
(45) Date of Patent: Jan. 10, 2017

(54) GESTURE-BASED FLASH

(71) Applicant: Amazon Technologies, Inc., Reno, NV (US)

(72) Inventor: Hao Hu, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 485 days.

(21) Appl. No.: 14/035,743

(22) Filed: Sep. 24, 2013

(51) Int. Cl.
  G06F 3/048 (2013.01)
  G06F 3/01 (2006.01)
  G06F 3/0488 (2013.01)

(52) U.S. Cl.
  CPC ........... G06F 3/017 (2013.01); G06F 3/04883 (2013.01); *H01H 2219/0023* (2013.01)

(58) Field of Classification Search
  CPC .................... H01H 2219/0023; G09G 3/3453; G06F 3/041; G06G 5/00
  See application file for complete search history.

(56) References Cited

U.S. PATENT DOCUMENTS

| | | | | |
|---|---|---|---|---|
| 5,909,207 A * | 6/1999 | Ho | ........................ | G06F 3/002 345/156 |
| 2008/0036743 A1* | 2/2008 | Westerman | ............. | G06F 3/038 345/173 |
| 2008/0309657 A1* | 12/2008 | Rhodes | .................. | G09G 3/344 345/214 |
| 2010/0225662 A1* | 9/2010 | Nakayama | ............ | G06F 3/0488 345/589 |
| 2010/0328353 A1* | 12/2010 | McDonald | .......... | G06F 3/04883 345/671 |
| 2011/0050591 A1* | 3/2011 | Kim | ...................... | G06F 3/0488 345/173 |
| 2012/0167017 A1* | 6/2012 | Oh | ........................ | G06F 3/0488 715/863 |
| 2013/0082916 A1* | 4/2013 | Dixit | ...................... | G06F 3/011 345/156 |
| 2013/0135215 A1* | 5/2013 | Bozarth | .................. | G06F 3/147 345/173 |
| 2014/0033141 A1* | 1/2014 | Samuels | ............. | G06F 3/04883 715/863 |
| 2014/0215341 A1* | 7/2014 | Fratti | ................. | G06F 17/30056 715/730 |
| 2014/0223382 A1* | 8/2014 | Hicks | .................. | G06F 3/04883 715/863 |

* cited by examiner

Primary Examiner — Dino Kujundzic
(74) Attorney, Agent, or Firm — Lee & Hayes, PLLC

(57) ABSTRACT

Examples of performing an update of a display device are described. In some implementations, user gesture data may be received in response to a user gesture being performed on a touch sensitive surface of the display device. In response to determining that the user gesture data is unrecognized, performing one or more default actions, including performing an update of the display device. The update may include performing a flash of the display device. The user gesture data may be associated with the one or more actions automatically or in response to the user providing input to associate the user gesture data with the one or more actions. The user gesture and the associated one or more actions may be stored such that the update of the display device may be performed when the user gesture is subsequently performed.

20 Claims, 6 Drawing Sheets

GESTURE-BASED FLASH

BACKGROUND

A large and growing population of users enjoy entertainment through the consumption of digital content items (or simply "content items"), such as music, movies, images, electronic books, and so on. The users employ various computing devices to consume such content items. Among these computing devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance the user experience continues to be a priority.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
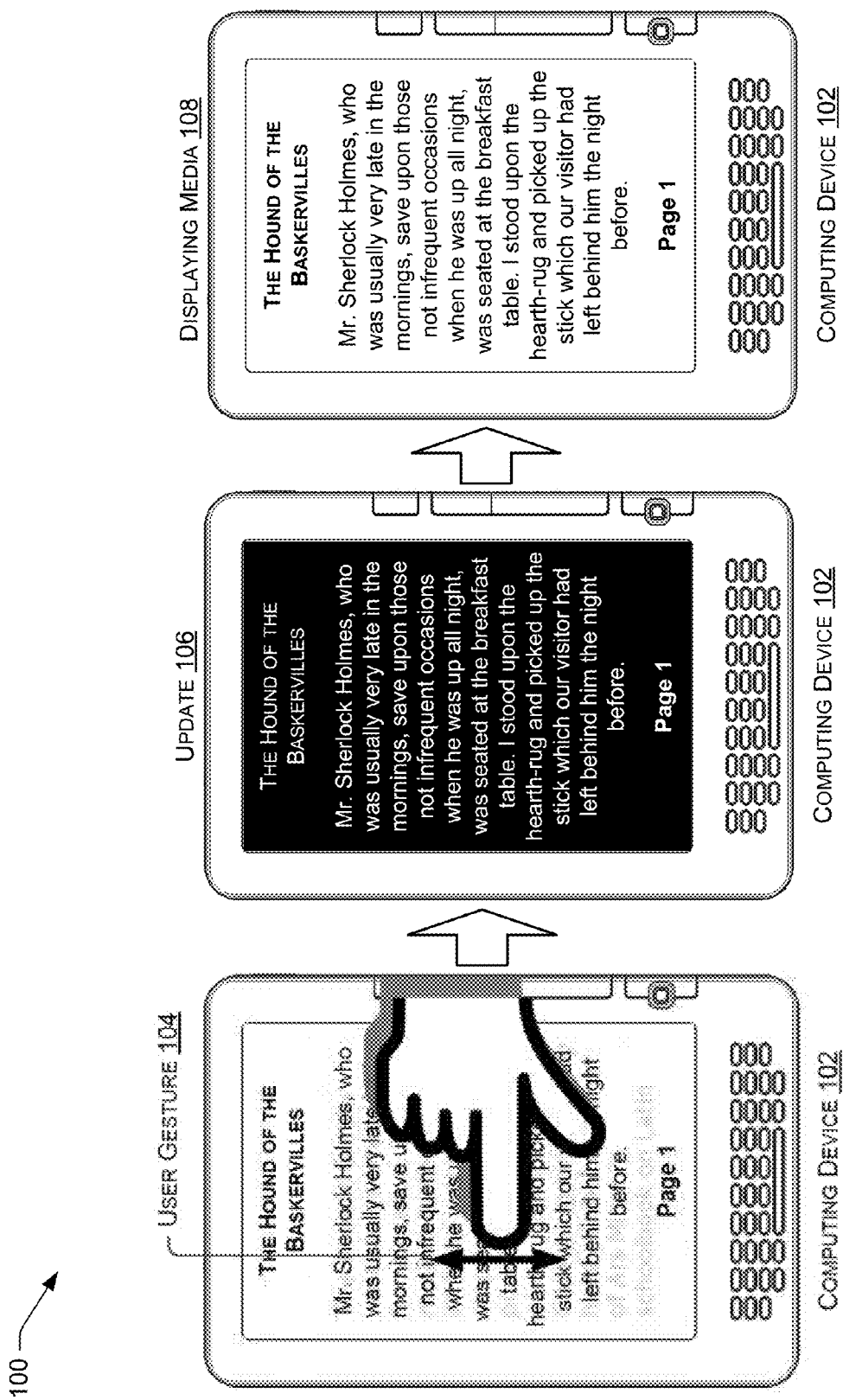
FIG. 1 is an illustrative system that includes a computing device that is capable of performing a flash based on a user gesture according to some implementations.

Computing devices used to consume digital content items may include specialized types of display devices. For example, computing devices used to display electronic books (eBook) may use electronic paper display devices that mimic the characteristics of ink on paper by reflecting light rather than emitting light. For example, electronic paper displays may use the movement of small particles to form pixels which in turn generate an image on a display. Unlike a liquid crystal display (LCD), electronic paper displays may be bi-stable, and retains a state without continued power. Thus, while continuous refresh of pixels forming an image is necessary to maintain an image on certain types of display technologies, such as LCDs, the pixels in electronic paper displays may retain their state without refresh.

Under certain conditions, electronic paper displays may display residual images that are referred to as ghosting. For example, previous pixel values may be visible on an electronic paper display even after updates have occurred to the display. To illustrate, if an electronic paper display presents three images sequentially, pixel values of the first image may create some "ghosting" effects when the third is image is presented, e.g., the pixel values of the first image may be at least partly visible when the device presents the third image.

Thus, ghosting (also referred to herein as page ghosting) is a visual effect that may be perceived by someone viewing the display device when a portion of an erased image still appears in a very small but perceivable manner on the display. In some cases, ghosting may appear to the user as if the display device has dirt on the display surface. To address ghosting, the display device may periodically perform a flash (also known as a flash update or screen flash update) to reset the pixels of the display. Resetting the pixels of the display may result in normalizing contrast values of the pixels of the display. For example, to normalize contrast values of the pixels, the flash may turn every pixel of the display device to a first color, from the first color to a second color, and then from the second color to a third color (the third color may be the same or different from the first color). For a grayscale display, the flash may move pixels from black to white and then to a value of the displayed content (e.g., a media file or other type of content). The flash update may take a particular amount of time to perform, during which the user may be unable to view the display or interact with the computing device. In addition, the user may find frequent flash updates visually unappealing. Thus, when the user is interacting with the computing device, reducing how often the flash update is performed may improve the user's experience. However, each user may have a different tolerance of page ghosting, making it difficult to determine when to perform a flash. For example, if a flash is performed at a predetermined interval, some users may regard the flash as being performed too often while other users may regard the flash as being performed not often enough.

The techniques described herein describe performing a flash in response to detecting a gesture made by a user (e.g., a user gesture) on a display device capable of receiving touch input (e.g., a touch-sensitive display device). In doing so, the techniques allow the user to define how often a flash is to occur, rather than implementing a uniform flash-rate across devices and users. In addition, the techniques may enable the device to learn when a particular user finds the page ghosting to have reached an unacceptable level and perform a flash, and may use this knowledge to automatically (e.g., without human interaction) flash at intervals preferred by the user.

As described above, ghosting may be perceived by users as a screen that appears to be "dirty," due to the residual effects of displaying multiple pages. When a user views a surface that appears "dirty," an instinctive reaction may include attempting to clean the surface, e.g., by using a portion of one or more appendages (e.g., fingertips) or a portion of the user's palm to wipe the surface. The techniques described herein may be used to detect a gesture that is attempting to clean the surface of a display device and, in response to detecting the gesture, perform a flash. Performing the flash may temporarily remove the visual effect of page ghosting so that the surface of the display device appears unblemished (e.g., free from visual effects such as ghosting).

In some cases, the gesture that caused the flash to be performed may be automatically (e.g., without human interaction) stored and associated with performing the flash. In other cases, the user may be asked whether the user desires to associate the gesture with the flash. For example, an outline of the gesture may be displayed and the user asked whether to associate the gesture with the flash. If the user indicates that the gesture is to be associated with the flash, the gesture may be stored and associated with performing the flash. Thus, after the gesture is stored, if the gesture is subsequently performed, the gesture may be recognized and a subsequent flash may be performed in response to detecting the gesture. In some cases, the device may enter a gesture learning mode to allow a user to perform a gesture that is to be associates with a specific action, such as performing a flash of the display device.

FIG. 1 is an illustrative system 100 that includes a computing device that is capable of performing a flash based on a user gesture according to some implementations. The system 100 include a computing device 102. The computing device 102 may be a desktop computer, a laptop computer, a tablet computer, a media playback device, an electronic book (eBook) reader, a mobile phone, another type of computing device, or any combination thereof.

The computing device 102 may be capable of displaying (e.g., playing back) media files, such as video files, audio files, eBooks, etc. on a display device associated with the computing device 102. After displaying media, such as an eBook, the visual effect of page ghosting may make a screen of the display device appear "dirty." In response to viewing the page ghosting, a user may perform a user gesture 104. For example, the user gesture 104 may appear as if the user was attempting to clean a surface of the display device. To illustrate, the user gesture 104 may be a single gesture that is made using a continuous motion and that includes two or more swipe gestures, with a first swipe gesture having a first direction and a second swipe gesture having a second direction that is approximately in an opposite direction (e.g., 180 degrees) from the first swipe gesture. In some cases, the user gesture 104 may include additional gestures, such as one or more of a third gesture in approximately the first direction, a fourth gesture in approximately the second direction, and so on. The first direction may be an up (e.g., bottom to top) motion, a down (e.g., a top to bottom) motion, a left to right motion, a right to left motion, a diagonal motion (e.g., top right to bottom left, top left to bottom right, bottom right to top left, bottom left to top right, etc.), or any combination thereof. As another illustration, the user gesture 104 may include a circular (e.g., clockwise or anti-clockwise motion). As yet another illustration, the user gesture 104 may include a wide gesture, such as a gesture made by a palm of a hand of the user.

In response to detecting the user gesture 104, the computing device 102 may perform an update that includes a flash 106, e.g., for a grayscale display, every pixel of the display device may be turned white, then black, then white, to normalize a contrast of the pixels. After the computing device 102 performs the flash 106, the computing device 102 may resume displaying the media 108. For a period of time after the flash 106 has been performed, the surface of the display device may appear unblemished (e.g., free from ghosting). For example, after the flash 106 has been performed, the surface of the display device may no longer display residual visual effects from displaying a different portion of the media. In some cases, the computing device 102 may automatically advance display (e.g., playback) of the media being displayed. For example, when displaying an eBook, the computing device may advance from a current page to a next page of the eBook after performing the flash 106.

Thus, when a user visually perceives page ghosting on a display device while viewing a media file, the user may perform an intuitive gesture, such as a gesture to attempt to clean the surface of the display device. In response to detecting the gesture, a computing device may perform a flash of the display device. The flash may reduce the effect of page ghosting by causing the page ghosting to be visually imperceptible to the user. After the flash is performed, the user may perceive the displayed media file as cleansed and/or unblemished because the flash has reduced or eliminated the residual effects of displaying previous content. In this way, different users may initiate a flash of a display device in accordance with each user's tolerance for page ghosting.

Figure 2:
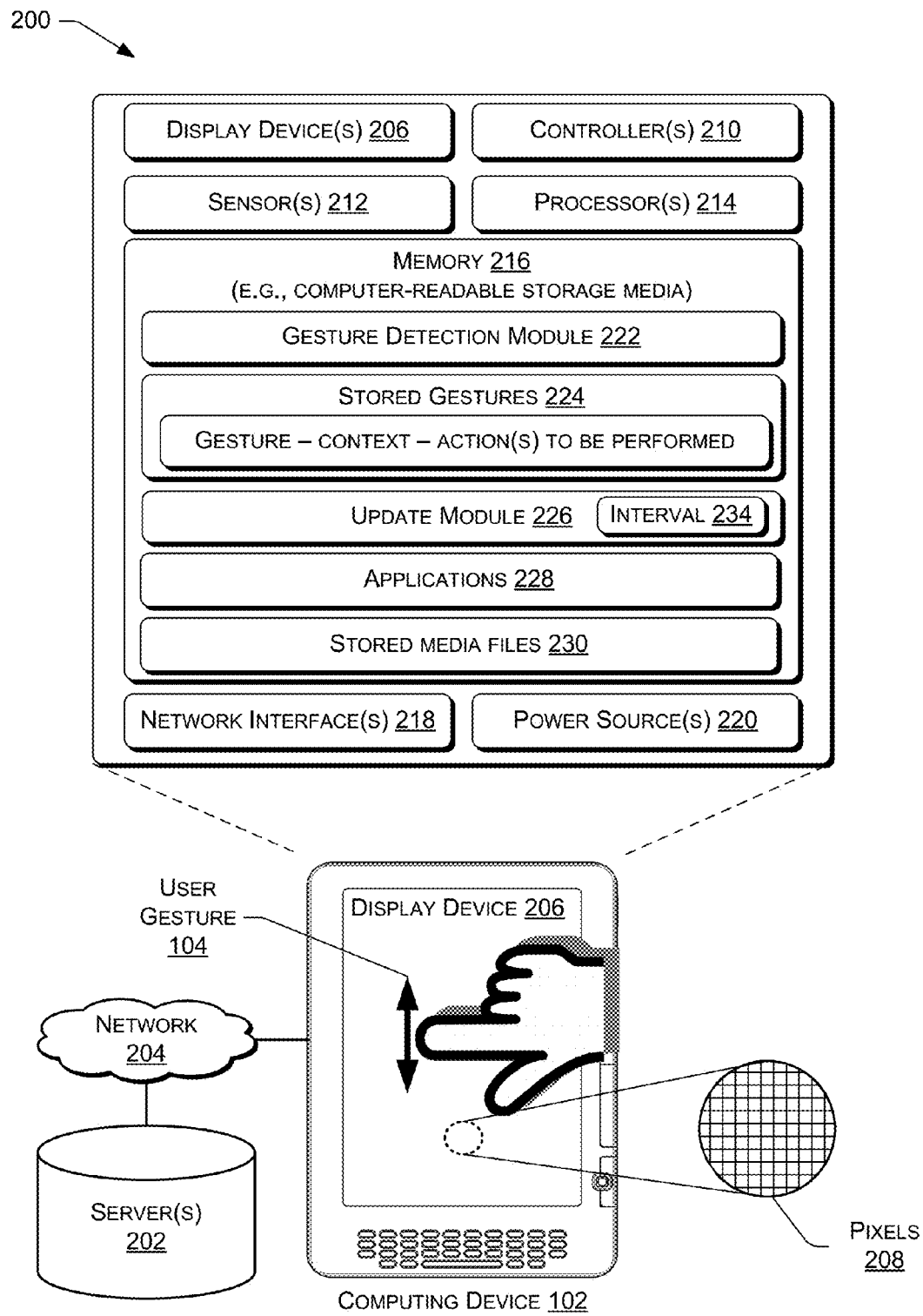
FIG. 2 is an illustrative architecture that includes a computing device coupled to one or more servers via a network according to some implementations.

FIG. 2 is an illustrative architecture 200 that includes a computing device coupled to one or more servers via a network according to some implementations. The architecture 200 includes the computing device 102 coupled to one or more servers 202 via a network 204. The servers 202 may include a storefront that enables the acquisition (e.g., purchase, rental, or the like) of digital content items (e.g., media files) for consumption by the computing device 102. In addition, the servers 202 may provide cloud-based services, including storing digital content items that may be consumed by the computing device 102. The network 204 may include one or more networks, such as a wireless local area network (e.g., WiFi®), a wireless wide area network (e.g., a code division multiple access (CDMA) or a global system for mobile (GSM) network), a wired network (e.g., Ethernet), other type of network, or any combination thereof.

The computing device 102 may be coupled to a display device 206 that includes one or more pixels 208. The display device 206 may include a touchscreen component capable of detecting gesture input and generating gesture-related data based on the gesture input. The touchscreen of the display device 206 may be an electronic visual display that the user can control through simple or multi-touch gestures by touching the screen with one or more fingers, a stylus, and/or ordinary or specially coated gloves. The touchscreen may be used as an input device to enable the user to interact directly with what is displayed on the display device 206, rather than using a mouse, touchpad, or other input device. The touchscreen may be implemented using various types of technologies, including resistive, capacitive, infrared, optical imaging, or acoustic pulse technologies. The computing device 102 may also include one or more controllers 210, one or more sensors 212, one or more processors 214, a memory 216, one or more network interfaces 218, and one or more power sources 220.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In some implementations, the display device 206 may be an electronic paper display. The electronic paper display may comprise an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray.

Of course, while one example has been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. These displays may be capable of rendering grayscale images or color images.

The controllers 210 may include a display controller to control the display device 206. For example, the display controller may be capable of instructing one or more of the display devices 108 to perform a flash update. The sensors 212 may include a touch sensor associated with the display device 206, an accelerometer, a temperature sensor, another type of sensor, or any combination thereof. The network interfaces 218 may be capable of coupling the computing device 102 to the server 202 via the network 204. For example, the network interfaces 218 may include one or more wireless interfaces, such as a wireless interface compliant with a wireless wide area network standard (e.g., CDMA or GSM) and/or a wireless local area network standard, such as WiFi®.

The memory 216 may include computer-readable storage media, such as volatile memory, non-volatile memory, removable memory, and/or non-removable memory, implemented in any method or technology for storage of information, such as computer-readable instructions, data structures, program modules, or other data. Also, the processors 214 may include onboard memory in addition to or instead of the memory 216. Examples of storage media that may be included in the memory 216 and/or processors 214 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processors 214. Any such computer-readable storage media may be part of the computing device 102. The memory 216 may include software programs or other executable modules that may be executed by the processors 214.

The memory 216 may include a gesture detection module 222, stored gestures 224, an update module 226, one or more applications 228 ("apps"), and one or more stored media files 230. The gesture detection module 222 may detect gestures, such as the user gesture 104, that are performed by the user. For example, the display device 206 may be touch-sensitive and/or pressure sensitive to enable the gesture detection module 222 may detect information associated with the user gesture 104. The information associated with the user gesture 104 may include a start location of the gesture, an end location of the gesture, a pressure of the gesture, a direction of the gesture, a width of the gesture, an angle relative to the display device of the gesture, other information associated with the gesture, or any combination thereof. The user gesture 104 may be performed by an instrument, such as a stylus, or by a portion of one or more appendages of the user, such as a tip of one or more fingers of a hand of the user. In some cases, the stored gestures 224 may include one or more gestures that simulate cleaning the display device 206. For example, the stored gestures 224 may include a single gesture that is made using a continuous motion and that includes two or more swipe gestures, such as a second gesture performed immediately after a first gesture. The first gesture may be in a first direction and the second gesture may be in an approximately opposite direction to the first direction. As another example, the stored gestures 224 may include a gesture that has a width greater than a predetermined threshold to enable identification of gestures that use a palm of the user's hand to simulate cleaning of the display device 206. To illustrate, any gesture with a width greater than the predetermined threshold may be interpreted by the computing device 102 as a cleaning gesture and thereby cause the computing device 102 to perform a display update that includes a flash of the display device 206.

The stored gestures 224 may be used to store gestures and associate each stored gesture with one or more actions that are to be performed when the gesture is performed. In some cases, the gesture detection module 222 may determine a context and perform an action from the stored gestures 224 based on the context and the gesture. For example, the context may include a type of media file being viewed on the display device 206, a location within the media file that is being viewed, a size of the media file, etc. The stored gestures 224 may include pre-programmed gestures and/or user programmed gestures. For example, the stored gestures 224 may include tap, double tap, pinch, stretch, flick, rotate, etc. Both the gesture and the context may determine the actions that are performed when the gesture is detected. For example, when the user performs a tap in an audio file, the audio file may be played back. When the user performs a tap on a word in an eBook, a meaning of the word may be looked up in a dictionary.

The update module 226 may perform updates (e.g., a flash) of the display. For example, the update module 226 may perform a flash device 206 to compensate for the results of page ghosting. For example, the flash may turn every pixel of the display device 206 to a first color, from the first color to a second color, then from the second color to a third color, to normalize a contrast of pixels 208 of the display device 206. After the contrast of the pixels 208 has been normalized, the update module 226 may cause the display to resume displaying media content. In some cases, after performing a flash, the computing device 102 may automatically advance to display a next portion of the media content. For example, when displaying a page of an eBook, after a flash has been performed, the computing device 102 may display a next page of the eBook.

The applications 228 may include various applications, such as applications to browse media files, applications to acquire media files, applications to download media files, applications to upload media files, media playback applications, etc. The stored media files 230 may include video files, audio files, eBook files, and the like.

The gesture detection module 222 may enable the user to perform a gesture on the display device 206, associate the gesture with one or more actions, and store the gesture and the associated actions in the stored gestures. For example, the device may enter a gesture learning mode and prompt the user to perform a gesture. The user may perform a gesture and the gesture detection module 222 may detect the gesture. The user may select one or more actions to be performed when the gesture detection module 222 detects the gesture. The user may specify context information with the gesture, such as a type of media or a type of application to associate with the gesture. The user may instruct the gesture detection module 222 to associate the gesture with the context and the selected actions and store the gesture, the context, and the associated actions in the stored gestures 224.

When the gesture detection module 222 detects that a gesture, such as the user gesture 104, has been performed, the gesture detection module 222 may compare the user gesture 104 with the stored gestures 224 to determine whether one of the stored gestures 224 matches the user gesture 104. If one of the stored gestures 224 matches the user gesture 104, the gesture detection module 222 may perform the associated one or more actions. For example, if the user has associated the user gesture 104 with a flash, in response to detecting the user gesture 104, the gesture detection module 222 may instruct the update module 226 to perform an update, such as a flash of the display device 206. In some cases, in response to detecting the user gesture 104, the gesture detection module 222 may determine a context, such as an application currently being executed or a type of a media file being played back, and determine the associated actions based on the user gesture 104 and the context.

When the user has not associated the user gesture 104 with one or more actions, the gesture detection module 222 may detect the user gesture 104 and determine that the user gesture 104 does not match any of the stored gestures 224. If the gesture detection module 222 determines that the stored gestures 224 do not include the user gesture 104, the gesture detection module 222 may infer that the user desires to update the display, and instruct the update module 226 to perform an update that includes a flash of the display device 206. In some cases, the gesture detection module may automatically (e.g., without human interaction) associate the user gesture 104 with the action of performing a flash and store the user gesture 104 with the associated action in the stored gestures 224.

In other cases, the gesture detection module 222 may determine whether user desires to associate the user gesture with performing a flash and store the user gesture 104 with the associated action in the stored gestures 224 if the user indicates that the user desires to associate the user gesture 104 with performing a flash. For example, the gesture detection module 222 may display a graphical representation of a most recent gesture performed by the user and ask the user whether the user desires to associate the gesture with performing a flash. After the gesture (e.g., the user gesture 104) and the associated action (e.g., perform a flash) have been stored in the stored gestures 224, the computing device 102 may automatically perform the gesture each time the gesture is detected. In some cases, the gesture detection module 222 may automatically measure a time interval between when a gesture (e.g., the user gesture 104) is performed and when the same gesture is subsequently performed. The gesture detection module 222 may automatically set an interval 234 at which a flash of the display device 206 is to be performed to the measured time interval. In this way, a flash of the display device 206 may be performed periodically (e.g., at the measured time interval) without the user having to perform the gesture more than a certain number of times sufficient for determining a period at which the user prefers a flash to occur.

Thus, the techniques described herein may be used to perform a flash in response to detecting a user gesture. In some cases, the user may enter a gesture learning mode, perform a gesture on a touch-sensitive display device, associate the gesture with one or more actions, such as flashing the display device to reduce the effect of page ghosting, and store the gesture and the associated action. In other cases, a computing device may automatically perform a flash in response to detecting an unrecognized gesture performed by a user. The computing device may automatically store the gesture and an associated action (e.g., performing a flash) or the computing device may determine whether the user desires to store the gesture and the associated action. After the gesture and the associated action have been stored, a flash of the display device may be performed each time the computing device detects that the gesture has been performed. In some cases, the computing device may measure a time interval between when the gesture is performed and when the gesture is subsequently performed and set an interval at which to flash the display to the time interval. In this way, the user may teach the computing device to perform a flash in response to the user performing an intuitive gesture, such as a gesture attempting to clean a surface of the display device.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processors 214, as hardware, and/or as firmware. Typically, the functionality of the program modules may be combined or distributed as desired in various embodiments. An implementation of these modules and techniques may be stored on or transmitted across some form of computer-readable media.

The modules stored in the memory 216 may be implemented across one or more servers in a cloud computing environment, on a local device, or on a combination of both. The following discussion does not limit the implementation of the modules stored in the memory 216 to any particular device or environment.

Furthermore, while FIG. 1 sets forth an example of a suitable architecture to perform a flash of a display device, numerous other possible architectures, frameworks, systems and environments will be apparent to those of skill in the art in view of the disclosure herein. Additionally, while the examples herein have been described in the environment of a grayscale display device, other implementations may be directed to other types of display devices, such as color display devices, three-dimensional (3D) display devices, and the like.

Figure 3:
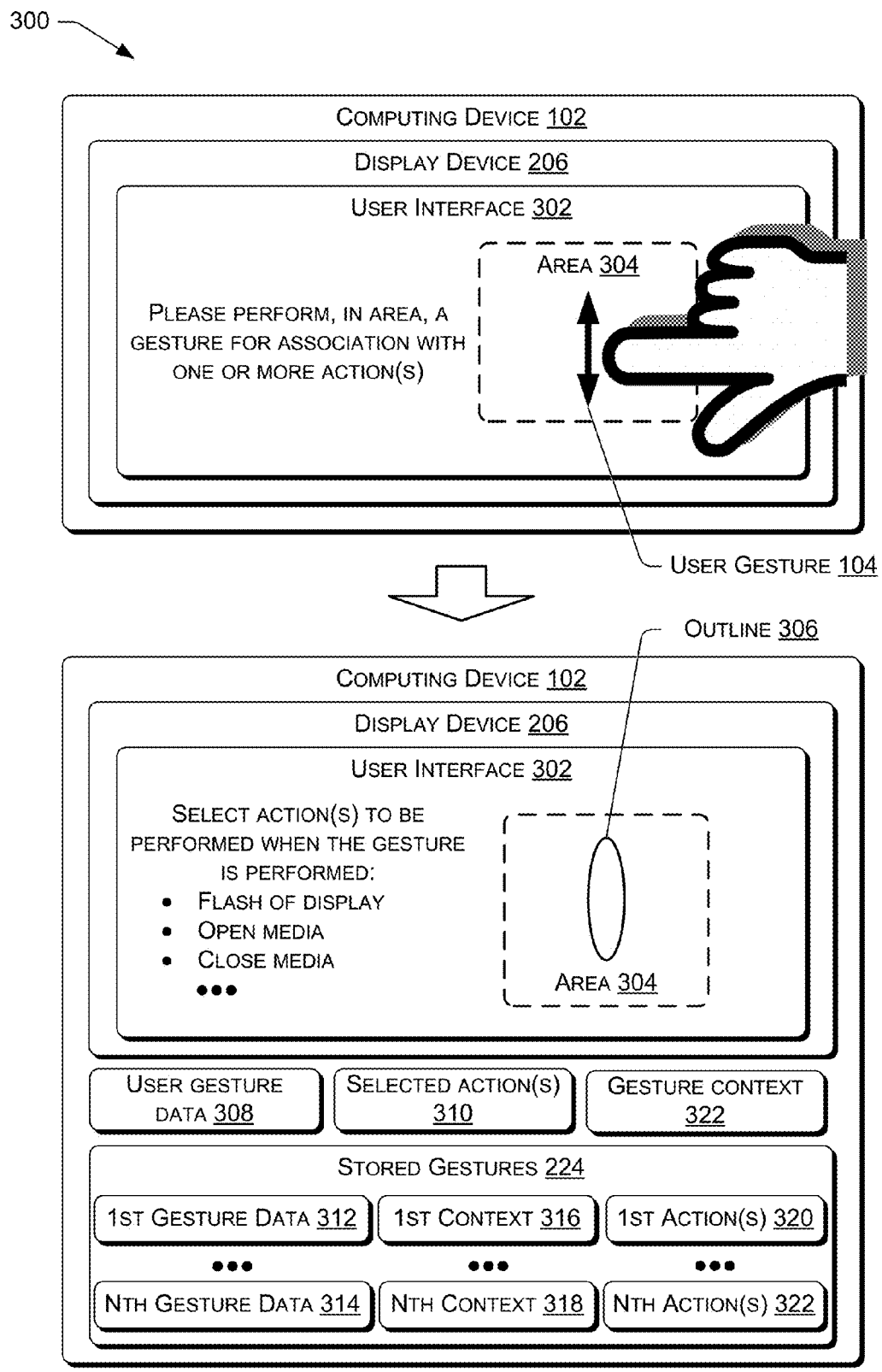
FIG. 3 is an illustrative system that includes a user interface to associate a gesture with an action according to some implementations.

FIG. 3 is an illustrative system 300 that includes a user interface to associate a gesture with an action according to some implementations. A user interface 302 may be displayed on the display device 206. The user interface 302 may prompt the user to perform a gesture (e.g., the user gesture 104) in an area 304. The user interface 302 may display an approximation of the performed gesture, such as an outline 306 of the user gesture 104. The user interface 302 may prompt the user to select one or more actions that are to be performed when the user gesture 104 is performed. The act of performing the user gesture 302 may cause a touch-screen portion of the display device 206 to generate user gesture data 308. In response to the user selecting one or more actions, the user interface 302 may associate selected actions 310 with the user gesture data 308 and store the association in the stored gestures 224.

The stored gestures 224 may include gesture data items, such as a first gesture data 312 to an Nth gesture data 314. The stored gestures 224 may include pre-programmed gestures and/or user programmed gestures. The user gesture data 308 and each of the one or more of the gesture data items 312 to 314 may include data associated with a corresponding user gesture, such as a starting location and an ending location (e.g., expressed as x and y coordinates on the display device 206) of the user gesture 104, a distance between the starting location and the ending location, locations where changes in direction occurred when the user gesture was being performed, a time taken to perform the user gesture, one or more directions associated with the user gesture, one or more angles (e.g., relative to an edge of the display device 206) associated with the user gesture, an amount of pressure exerted while performing the user gesture, a shape of the user gesture, a size (e.g., a length and a width) of the user gesture, other information associated with the user gesture 104, or any combination thereof.

In some cases, one or more of the gesture data 312 to 314 may have an associated context, such as a first context 316 to an Nth context 318. For example, the first gesture data 312 may be associated with a first context 316 and the Nth gesture data 314 may be associated with an Nth context 318. While FIG. 2 illustrates each of the gesture data 312 to 314 as having an associated context, in some cases, at least one of the gesture data 312 to 314 may not have an associated context. The context may identify a type of a file, a location within the file, a size of the file, other information associated with a context in which the user gesture was performed, or any combination thereof. For example, performing a gesture in a first type of file (e.g., audio file) may cause a first set of actions (e.g., playback the audio file from the beginning) to be performed while performing the same gesture in a second type of file (e.g., electronic book) may cause a second set of actions (e.g., open the electronic book to a first page) to be performed. In this example, the type of file is the context used to determine the action to be performed. Thus, the same gesture may be associated with multiple different contexts and multiple sets of actions such that performing the same action in a different context may result in a different set of actions being performed.

Each of the gesture data 312 to 314 may be associated with one or more actions. For example, the first gesture data 312 may be associated with first actions 320 and the Nth gesture data 314 may be associated with Nth actions 322. Each of the N actions 320 to 322 may include a set of one or more actions to be performed when the associated gesture data (one of the gesture data items 312 to 314) is detected.

When the user subsequently performs the user gesture 104, the act of performing the user gesture 104 may cause a touchscreen of the display device 206 to generate input values, such as the user gesture data 308. The computing device 102 may compare the user gesture data 308 to the gesture data 312 to 314 to determine if the user gesture 104 is a recognized (e.g., previously stored) gesture. If the user gesture 104 is a recognized gesture, the associated actions may be performed. For example, the Nth actions 322 may be performed in response to determining that the user gesture data 308 matches the Nth gesture data 314. The user gesture data 308 may match the Nth gesture data 314 when the user gesture data 308 differs from the Nth gesture data 314 by less than a predetermined threshold. For example, after the user gesture data 308 is stored (e.g., as one of the stored gestures 224) with the selected actions 310, the computing device 102 may perform the selected actions 310 when the user gesture 104 is subsequently performed.

In some cases, in response to detecting the user gesture 104, the computing device 102 may determine a gesture context 322 associated with the user gesture 104. The gesture context 322 may identify a context within which the user gesture 104 was performed, such as an application (e.g., search engine application, electronic commerce application, media playback application, or the like) that was executing when the user gesture 104 was detected, a type of media that was being played back when the user gesture 104 was detected, etc. For example, when the user gesture 104 is detected, the computing device 102 may compare the user gesture data 308 with the gesture data items 312 to 314. If the user gesture data 308 matches one of the gesture data items 312 to 314, the associated one of the N actions 320 to 322 may be performed. If the user gesture data 308 matches two or more of the gesture data items 312 to 314, the computing device 102 may determine the gesture context 322 associated with the user gesture 104. The computing device 102 may compare the gesture context 322 with the matching two or more of the gesture data items 312 to 314 and perform one of the N actions 320 to 322. Thus, in some cases, one of the N actions 320 to 322 may be performed based on the user gesture data 308 and the gesture context 322 associated with the user gesture 104.

Thus, the user interface 302 may be displayed when a gesture learning mode is entered and/or when an unknown or new gesture (e.g., a gesture that does not match the stored gestures) is detected. In this way, the user can perform a new gesture and associate user gesture data generated by the new gesture with one or more actions, such as performing a flash of the display device 206. For example, the user gesture data 308 associated with the new gesture and the selected actions 310 may be stored in the stored gestures 224.

The user gesture data 308 associated with the new gesture and the selected actions 310 may be stored in the stored gestures 224 automatically or in response to user input received via the user interface 302. When the user gesture 104 is subsequently detected, the computing device 102 may compare the user gesture data 308 generated by the user gesture 104 with the gesture data items 312 to 314. The computing device 102 may perform a set of actions from the N actions 320 to 322 when the user gesture data 308 matches one of the gesture data items 312 to 314.

Figure 4:
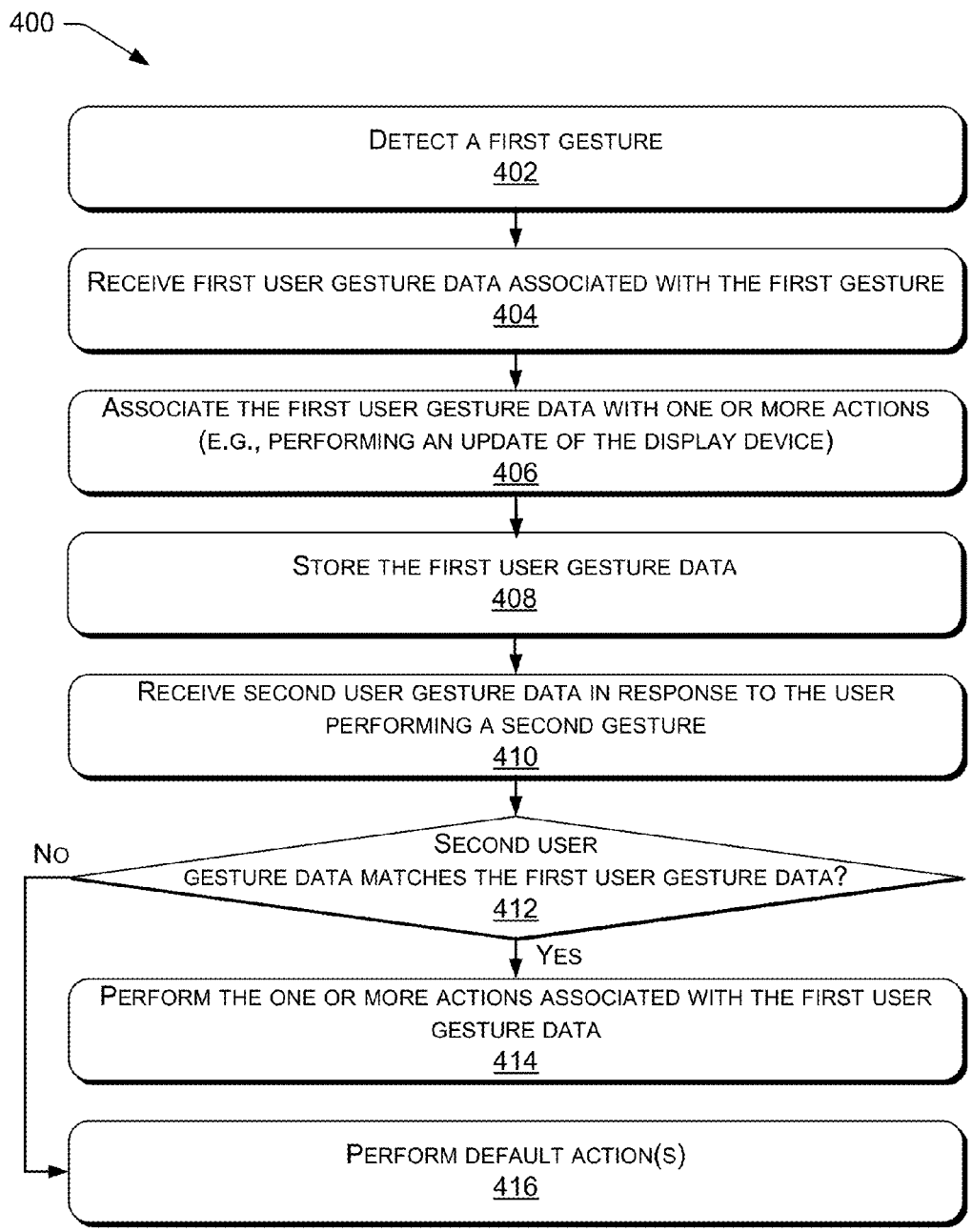
FIG. 4 is a flow diagram of an example process that includes associating user gesture data with performing one or more actions according to some implementations.
Figure 5:
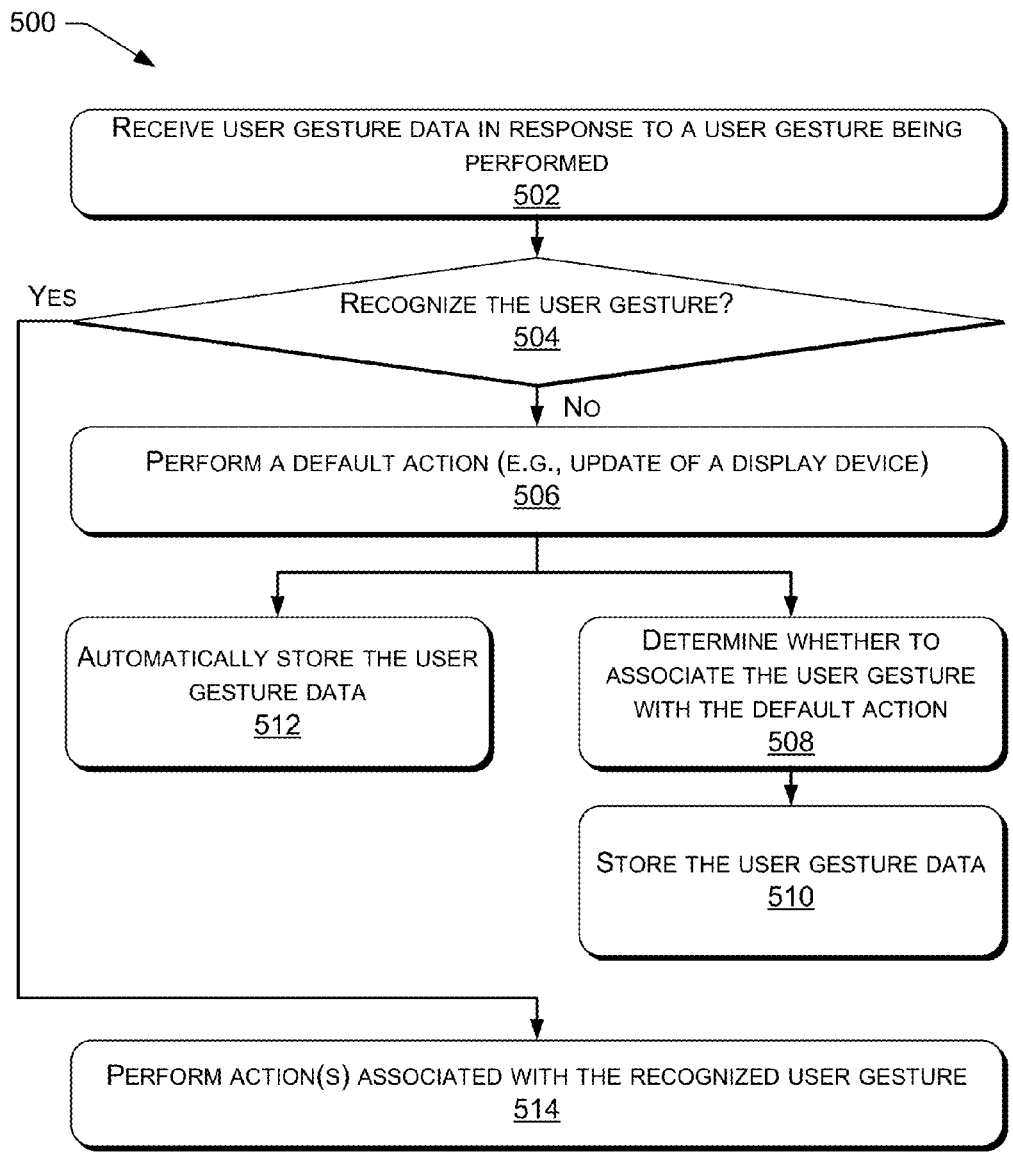
FIG. 5 is a flow diagram of an example process that includes storing user gesture data according to some implementations.
Figure 6:
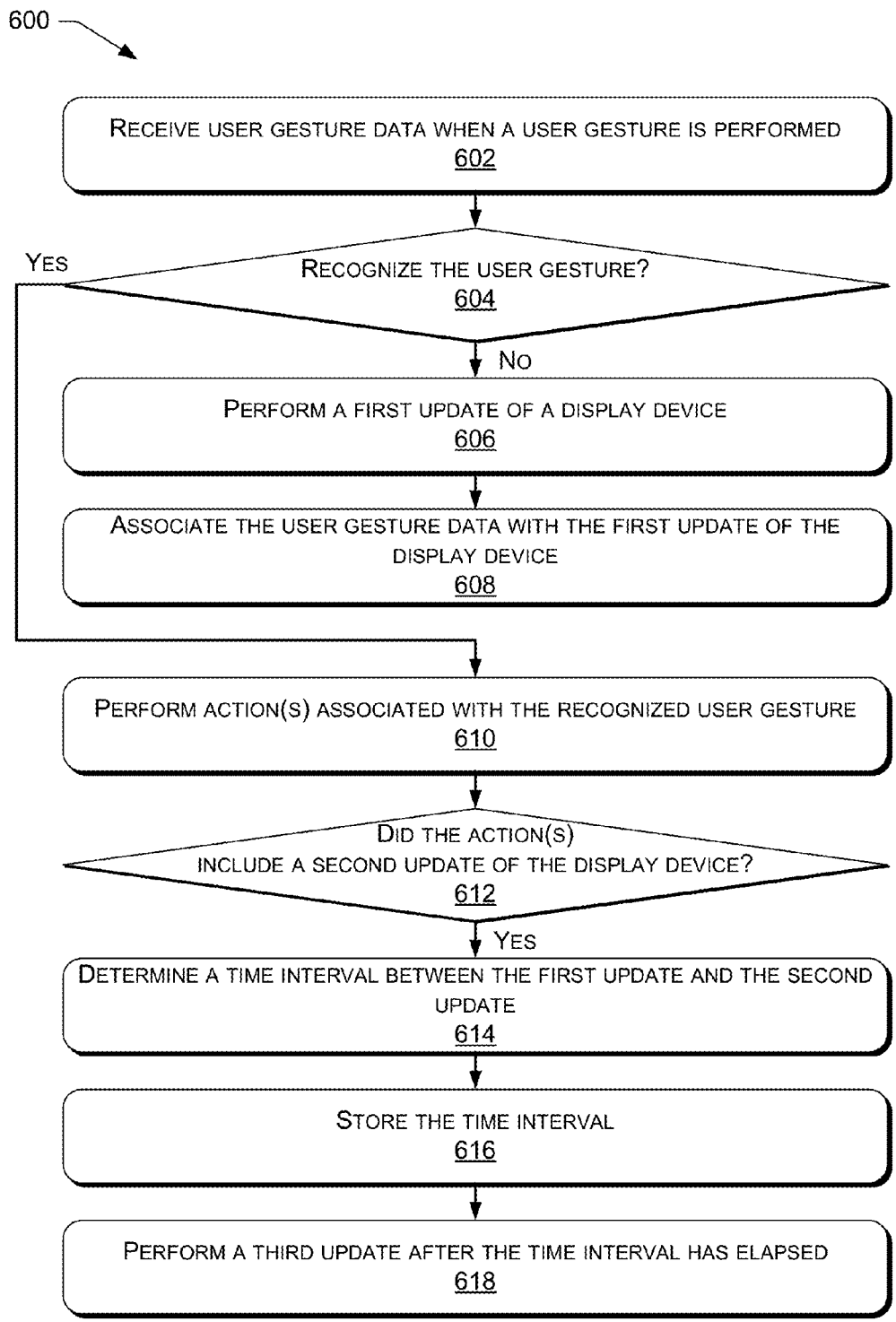
FIG. 6 is a flow diagram of an example process that includes storing a time interval between a first update and a second update according to some implementations.

In the flow diagrams of FIGS. 4-6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500 and 600 are described with reference to the systems and architectures 100, 200 and 300 as described above, although other models, frameworks, systems and environments may be used to implement these processes.

FIG. 4 is a flow diagram of an example process 400 that includes associating user gesture data with performing one or more actions according to some implementations. For example, the process 400 may be performed by the computing device 102 of FIG. 1, 2 or 3.

At 402, a first gesture may be detected. At 404, first user gesture data associated with the first gesture may be received. For example, in FIG. 3, the computing device 102 may receive the user gesture data 308 associated with the user gesture 104 when the user gesture 104 is performed.

At 406, the first gesture data may be associated with one or more actions. For example, in FIG. 3, the user interface 302 may prompt the user to select one or more actions to be associated with the user gesture 104. The selected actions 310 may be associated with the user gesture data 308.

At 408, the first gesture data may be stored. For example, in FIG. 3, the computing device 102 may associate the selected actions 310 with the user gesture data 308 and store the selected actions 310 with the user gesture data 308 in the stored gestures 224.

At 410, second user gesture data may be received in response to the user performing a second gesture. For example, in FIG. 3, in response to a user performing the user gesture 104 on a touchscreen portion of the display device 206, a module of the computing device 102 may receive the user gesture data 308 from the touchscreen portion of the display device 206.

At 412, a determination may be made whether the second user gesture data matches the first user gesture data. For example, in FIG. 3, the computing device 102 may determine whether the user gesture data 308 matches one of the gesture data items 312 to 314.

In response to determining that the second user gesture data matches the first user gesture data, at 412, the one or more actions associated with the first user gesture data may be performed, at 414. For example, in FIG. 3, if the computing device 102 determines that the user gesture data 308 matches the Nth gesture data 314, the computing device 102 may perform the associated Nth actions 322. If the Nth actions 322 include performing an update and/or a flash, the computing device 102 may perform the update and/or a flash of the display device 206.

In response to determining that the input gesture does not match the stored gesture, at 412, one or more default actions associated with the input gesture may be performed, at 416. For example, in FIG. 3, if the computing device 102 determines that the user gesture data 308 does not match any of the gesture data items 312 to 314, the computing device 102 may perform a default action, such as an update and/or a flash of the display device 206. In some embodiments, the user may select one or more actions to associate with the new gesture instead of having a default set of actions associated with the new gesture.

Thus, a user interface may enable a user to perform a first gesture, associate first gesture data (e.g., generated by the first gesture) with one or more actions, and store the first gesture data and the associated actions. When second gesture data is generated in response to a second gesture being performed, the second gesture data may be compared with multiple stored gesture data. If the second gesture data matches one of the multiple stored gesture data, one or more actions associated with the matching stored gesture data may be performed. If the second gesture data does not match one of the multiple stored gesture data, one or more default actions may be performed.

FIG. 5 is a flow diagram of an example process 500 that includes storing user gesture data according to some implementations. For example, the process 500 may be performed by the computing device 102 of FIG. 1, 2 or 3.

At 502, user gesture data may be received in response to a user gesture being perform. At 504, a determination may be made whether the user gesture is recognized. For example, in FIG. 2, the gesture detection module 222 may detect the user gesture 104 and compare the user gesture 104 with the stored gestures 224 to determine whether the user gesture 104 is a recognized gesture. As another example, in FIG. 3, the user gesture data 308 associated with the user gesture 104 may be generated (e.g., received by a module of the computing device 102). The user gesture data 308 may be compared with the gesture data items 312 to 314 to determine if the user gesture 104 is recognized.

In response to determining that the gesture is not recognized, at 504, a default action may be performed, at 506. For example, in FIG. 3, if the user gesture data 308 associated with the user gesture 104 does not match any of the gesture data items 312 to 314, one or more default actions, such as an update of the display device that includes a flash of the display device, may be performed.

In some cases, at 508, a determination may be made whether to associate the user gesture with the action. At 510, the user gesture data (associated with the user gesture) may be stored. For example, in FIG. 3, if the user gesture data 308 corresponding to the user gesture 104 does not match any of the gesture data items 312 to 314, the user interface 302 may display a prompt to determine whether the user desires to associate the user gesture data 308 with one or more actions. If the user provides user input indicating to associate the user gesture 104 with one or more actions, the computing device 102 may associate the user gesture data 308 with the one or more actions and store the user gesture data 308 and the one or more actions in the stored gestures 224.

In other cases, at 512, the user gesture data (associated with the user gesture) may be automatically stored. For example, in FIG. 3, if the user gesture data 308 corresponding to the user gesture 104 does not match any of the gesture data items 312 to 314, the computing device 102 may automatically perform an update that include a flash of the display device 206 and automatically store the user gesture data 308 (e.g., and the associated action of performing an update) in the stored gestures 224.

In response to recognizing the user gesture, at 504, one or more actions associated with the recognized user gesture may be performed, at 514. For example, in FIG. 2, if the user gesture 104 is one of the stored gestures 224, the gesture detection module 222 may request one or more software and/or hardware components of the computing device 102 to perform the actions associated with the user gesture 104. To illustrate, in FIG. 3, if the computing device 102 determines that the user gesture data 308 matches the Nth gesture data 314, the computing device 102 may perform the associated Nth actions 322. If the Nth actions 322 include performing an update and/or a flash, the computing device 102 may perform the update and/or the flash of the display device 206.

Thus, if a gesture is not recognized, an update (e.g., a flash and/or other actions) may be performed, the gesture associated with the flash and/or other actions, and the gesture stored. In some cases, the flash and/or other actions may be performed and the gesture stored automatically. In other cases, the user may be asked whether to associate and store the gesture with the flash and/or other actions. After the gesture is stored, when the user subsequently performs the gesture, the associated actions may be automatically performed. In this way, a gesture that the user performs in an attempt to clean the screen of a display device may be used to perform a flash of the display device.

FIG. 6 is a flow diagram of an example process 600 that includes storing a time interval between a previous flash and a flash according to some implementations. For example, the process 600 may be performed by the computing device 102 of FIG. 1, 2 or 3.

At 602, user data may be received when a user gesture is performed. At 604, a determination may be made whether the user gesture is recognized. For example, in FIG. 2, the gesture detection module 222 may detect the user gesture 104 and compare the user gesture 104 with the stored gestures 224 to determine whether the user gesture 104 is a recognized gesture. As another example, in FIG. 3, the computing device 102 may receive the user gesture data 308 when the user gesture 104 is performed. The computing device 102 may compare the user gesture data 308 to the gesture data items 312 to 314. If the user gesture data 308 differs from each of the gesture data items 312 to 314 by more than a predetermined threshold, the computing device 102 may determine that the user gesture is not recognized. If the user gesture data 308 differs from each of the gesture data items 312 to 314 by less than or equal to the predetermined threshold, the computing device 102 may determine that the user gesture is recognized.

In response to determining that the gesture is not recognized, at 604, a first update of the display device may be performed, at 606. At 608, the user gesture data may be associated with the first update of the display device and the user gesture data and the action of performing an update (e.g., the first update) may be stored. For example, in FIG. 2, the gesture detection module 222 may determine that the stored gestures 224 do not include the user gesture 104 and instruct the update module 226 to perform an update (e.g. a flash) of the display device 206. The gesture detection module 222 may store the user gesture 104 in the stored gestures 224. In some cases, a determination may be made whether a user desires to associate the user gesture with the action. If the user indicates a desire to associate the user gesture with one or more actions, the computing device may associate the user gesture with the one or more actions and store the user gesture and the associated actions. In other cases, the user gesture may be automatically stored.

In response to recognizing the user gesture, at 604, one or more actions associated with the recognized user gesture may be performed, at 610. For example, in FIG. 2, if the user gesture 104 is one of the stored gestures 224, the gesture detection module 222 may request one or more software and/or hardware components of the computing device 102 to perform the actions associated with the user gesture 104. To illustrate, the gesture detection module 222 may instruct the update module 226 to perform an update (e.g., a flash) of the display device 206.

At 612, a determination may be made as to whether the user gesture caused a second update to be performed. If a determination is made that the user gesture did not cause a second update to be performed, the process 600 may not perform any additional actions.

If a determination is made that the user gesture caused a second update to be performed, at 612, then a time interval between the first update and the second update may be determined, at 614. At 616, the time interval may be stored. At 618, a subsequent flash may be performed based on the time interval. For example, in FIG. 2, the gesture detection module 222 may determine the interval 234 between an update and a previous update, store the interval 234 in the memory 216, and instruct the update module 226 to perform subsequent updates (e.g., including flashes) based on the interval 234. If a second update was not performed, the process 600 may wait until a second update is performed and determine a time interval between the first update and the second update. In some cases, the computing device may determine a difference between a first screen displayed immediately prior to the first update and a second screen displayed immediately prior to the second update. The computing device may use the determined difference as a tolerance level and perform subsequent updates to the display device when a difference between a third screen being displayed and the second screen matches or exceeds the tolerance level.

Thus, if a gesture is not recognized, a first update (e.g., a flash and/or other actions) may be performed, the gesture associated with the action of performing an update, and the gesture stored. The gesture may be stored automatically or the user may be asked whether to store the gesture with the associated actions. After the gesture is stored, when the user subsequently performs the gesture, the associated actions may be automatically performed. If the gesture causes a second update to be performed, a time interval between the first update and the second update may be determined. Subsequent updates to the display device may be performed based on the time interval. In this way, a gesture that the user performs in an attempt to clean the screen of a display device may be used to perform an update (e.g., including a flash) of the display device. A subsequent gesture may be used to determine a time interval at which to perform subsequent updates.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic device comprising:
   a touchscreen display;
   one or more processors coupled to the touchscreen display; and
   computer-readable storage media comprising instructions executable by the one or more processors to perform acts comprising:
   presenting a portion of a digital item on the touchscreen display;
   receiving user gesture data corresponding to a user gesture performed on the touchscreen display;
   comparing the user gesture data to one or more stored gesture data items; and
   determining that the user gesture data does not match the one or more stored user gesture data items; and
   performing a flash update of the touchscreen display, the flash update comprising:
   changing each pixel of the touchscreen display to a first color;
   changing each pixel of the touchscreen display from the first color to a second color to normalize a contrast of pixels of the touchscreen display; and
   re-displaying the portion of the digital item.

2. The electronic device of claim 1, the acts further comprising:
   storing the user gesture data in association with the flash update.

3. The electronic device of claim 1, the acts further comprising:
   receiving user input;
   storing the user gesture data in association with the flash update based at least in part on the user input.

4. The electronic device of claim 1, wherein:
   the user gesture comprises a single gesture made using a continuous motion, the user gesture including:
   a first swipe gesture in a first direction; and
   a second swipe gesture in a second direction, the second direction being different from the first direction.

5. The electronic device of claim 1, wherein the user gesture is performed using a continuous motion.

6. A computer-implemented method comprising:
presenting a portion of content of an item on a touchscreen display;
receiving user gesture data in response to a user gesture being performed on the touchscreen display;
comparing the user gesture data with previously stored gesture data items;
determining that the user gesture data differs from individual ones of the previously stored gesture data items;
performing a flash update of the touchscreen display to reduce a ghosting of the touchscreen display, the flash update comprising:
changing each pixel of the touchscreen display to a first color;
changing the each pixel of the touchscreen display from the first color to a second color; and
re-displaying the portion of the content of the item;
creating an association of the user gesture data with the flash update; and
storing the user gesture data and the association with the flash update.

7. The computer-implemented method of claim 6, further comprising:
receiving second user gesture data in response to a second user gesture being performed on the touchscreen display;
determining a time interval between receiving the user gesture data and receiving the second user gesture data; and
performing one or more additional flash updates of the touchscreen display based on the time interval, each of the one or more additional flash updates comprising:
changing each pixel of the touchscreen display to a first color; and
changing each pixel of the touchscreen display from the first color to a second color.

8. The computer-implemented method of claim 6, further comprising:
recognizing the user gesture data; and
performing the flash update of the touchscreen display.

9. The computer-implemented method of claim 6, wherein the method further comprises:
receiving input to associate the user gesture with the flash update.

10. The computer-implemented method of claim 6, wherein:
the user gesture comprises a single gesture that is made using a continuous motion and includes at least a first swipe gesture in a first direction and a second swipe gesture in a second direction that is different from the first direction.

11. The computer-implemented method of claim 10, wherein:
the second direction is approximately opposite to the first direction.

12. A computing device comprising:
a display device having a touch sensitive surface and comprising a plurality of pixels;
one or more processors coupled to the display device; and
computer-readable media comprising instructions executable by the one or more processors to perform acts comprising:
displaying a portion of media content on the display device;
receiving user gesture data in response to a user gesture being performed on the touch sensitive surface of the display device;
comparing the user gesture data with one or more stored gesture data items;
determining that the user gesture data differs from the one or more stored gesture data items;
performing a flash update of the display device to reduce a visual effect of ghosting, the flash update comprising:
changing each pixel of the plurality of pixels to a first color;
changing each pixel of the plurality of pixels from the first color to a second color; and
displaying the portion of the media content.

13. The computing device of claim 12, wherein the acts further comprise:
prompting a user to perform the user gesture;
receiving the user gesture data; and
storing the user gesture data in association with one or more actions that include performing the flash update of the display device.

14. The computing device of claim 12, wherein the acts further comprise:
enabling a gesture learning mode;
receiving a selection of at least one action; and
storing the user gesture data in association with the at least one action.

15. The computing device of claim 12, the acts further comprising:
receiving second user gesture data in response to the user gesture being performed on the touch sensitive surface of the display device;
determining a time interval between receiving the user gesture data and the second user gesture data; and
setting a timer to periodically perform the flash update of the display device based on the time interval.

16. The computing device of claim 12, the acts further comprising:
automatically performing one or more default actions in addition to performing the flash update of the display device.

17. The computing device of claim 12, the acts further comprising:
automatically storing an association between the user gesture data and performing the flash update of the display device.

18. The computing device of claim 12, wherein:
the user gesture simulates a gesture to clean a portion of the touch sensitive surface of the display device.

19. The computing device of claim 18, wherein:
the user gesture to clean the portion of the touch sensitive surface of the display device comprises a single gesture that is made using a continuous motion and that includes at least a first swipe gesture in a first direction.

20. The computing device of claim 19, wherein:
the user gesture to clean the portion of the touch sensitive surface of the display device further comprises a second swipe gesture in a second direction, the second direction being approximately opposite to the first direction.

* * * * *